United States Patent [19]

Yamashita et al.

[11] Patent Number: 4,890,097
[45] Date of Patent: Dec. 26, 1989

[54] ACTIVE MATRIX CIRCUIT FOR LIQUID CRYSTAL DISPLAYS

[75] Inventors: Ichiro Yamashita, Katano; Mamoru Takeda, Hirakata, both of Japan

[73] Assignee: Matsushita Electric Industrial Co., Ltd., Osaka, Japan

[21] Appl. No.: 144,787

[22] Filed: Jan. 21, 1988

Related U.S. Application Data

[63] Continuation-in-part of Ser. No. 798,030, Nov. 14, 1985, abandoned.

[30] Foreign Application Priority Data

Nov. 16, 1984 [JP] Japan ................. 59-242876
Apr. 19, 1985 [JP] Japan ................. 60-85241
Apr. 20, 1985 [JP] Japan ................. 60-83622

[51] Int. Cl.[4] ............................................. G09G 3/00
[52] U.S. Cl. ................................... 340/719; 340/784; 350/332
[58] Field of Search ............. 340/784, 811, 805, 719, 340/765, 752, 703, 715; 350/332, 333, 330

[56] References Cited

U.S. PATENT DOCUMENTS

| | | | |
|---|---|---|---|
| 4,233,601 | 11/1980 | Hankins et al. | 340/703 |
| 4,367,464 | 1/1983 | Kurahashi et al. | 340/752 |
| 4,368,523 | 1/1983 | Kawate | 340/784 |
| 4,429,305 | 1/1984 | Hosokawa et al. | 340/784 |
| 4,471,347 | 9/1984 | Nakazawa et al. | 340/719 |
| 4,529,890 | 7/1985 | Kobayashi et al. | 340/811 |
| 4,633,242 | 12/1986 | SEkiya | 340/811 |
| 4,642,619 | 2/1987 | Togashi | 340/703 |
| 4,680,580 | 7/1987 | Kawahara | 340/719 |
| 4,694,287 | 9/1987 | Chevevas-Paule et al. | 340/719 |

FOREIGN PATENT DOCUMENTS

| | | | |
|---|---|---|---|
| 0030159 | 6/1981 | European Pat. Off. | 340/701 |
| 60-192369 | 9/1985 | Japan . | |
| 2115199A | 9/1983 | United Kingdom . | |

OTHER PUBLICATIONS

"Varistor-Controlled Liquid-Crystal Displays", Castelberry, Donald E., vol. ED-26, No. 8, Aug. 1979, pp. 1123-1128.

Primary Examiner—Gerald Brigance
Assistant Examiner—M. Fatahi-Yar
Attorney, Agent, or Firm—Wenderoth, Lind & Ponack

[57] ABSTRACT

An active matrix circuit for liquid crystal displays includes a plurality of liquid crystal pixels arranged in a matrix, a plurality of scanning lines supplied with selection pulses to select rows of the pixel matrix, a plurality of signal lines supplied with signal voltages which are supplied to the pixels in a selected row, and a plurality of switching elements responsive to the respective selection pulses for supplying the signal voltages to the respective pixels. Each pixel is controlled by two switching elements responsive to selection pulses supplied adjaent to two scanning lines. If one of the two switching elements is defective due to a manufacturing process, it is later electrically isolated from the circuit. The other one can control the respective pixel to operate normally. The switching element may be a transistor or a non-linear device.

10 Claims, 13 Drawing Sheets

FIG. 6
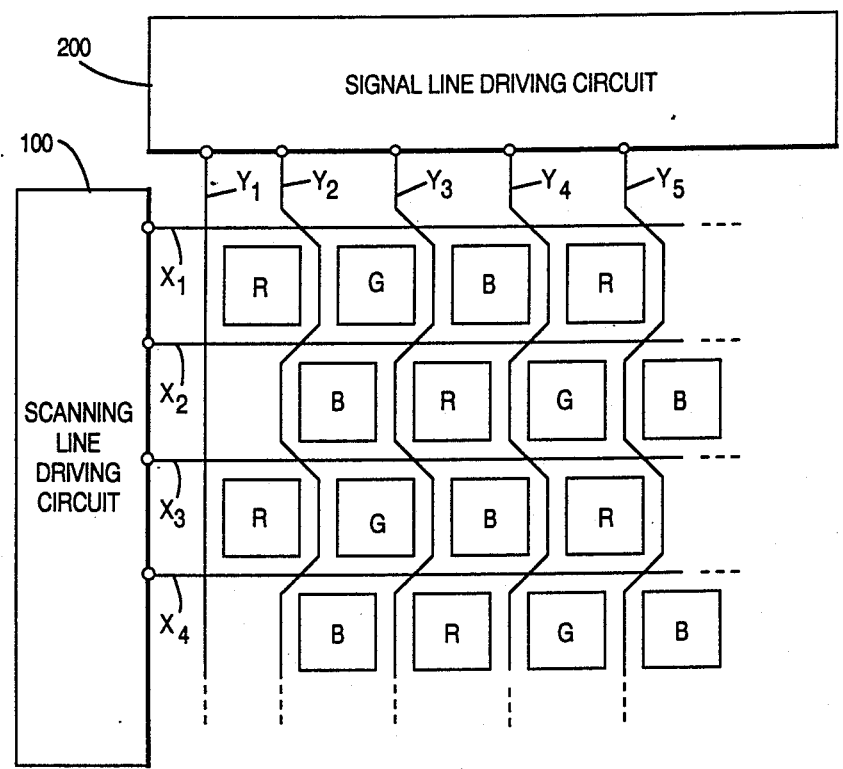
FIG. 7(a)
FIG. 7(b)
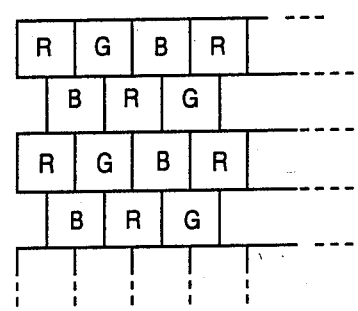

ACTIVE MATRIX CIRCUIT FOR LIQUID CRYSTAL DISPLAYS

This is a continuation-in-part of now abandoned application Ser. No. 798,030 filed Nov. 14, 1985, now abandoned.

BACKGROUND OF THE INVENTION

1. Field of the Invention

This invention relates to an active matrix circuit for liquid crystal displays (liquid crystal display is hereinafter referred to as LCD) for driving liquid crystal pixels arranged in a matrix on a liquid crystal display pannel.

2. Description of the Prior Art

The active matrix drive method has been known as one of the desirable methods for driving LCDs. The active matrix drive type LCD comprises a plurality of scanning lines extending in an X direction, a plurality of signal lines extending in a Y direction, and a plurality pairs of a pixel and a switching element disposed at crosspoints of the scanning and signal lines. Each pixel is driven by each respective switching element. The switching element may be a thin film transistor (TFT, hereafter) or a non-linear device such as a varistor, a metal-insulator-metal (MIM), a diode ring, a back-to-back diode and a MOS transistor diode.

A TFT array as shown in FIG. 12 is known as a typical active matrix circuit for LCDs, as disclosed, for example, in Japanese Laid-open Patent Application No. 60-192369 Referring to FIG. 12, $C_{11}$, $C_{12}$, ... and $C_{21}$, $C_{22}$, ... are liquid crystal pixels, $T_{11}$, $T_{12}$, ... and $T_{21}$, $T_{22}$, ... are TFTs, $X_1$, $X_2$, $X_3$, ... are scanning lines, and $Y_1$, $Y_2$, $Y_3$, ... are signal lines. Each TFT has its gated connected to a respective scanning line, and has its source connected to a respective signal line, and has its drain connected to one terminal of a respective pixel. The other terminal of the respective pixel is connected to ground. Each pixel acts as a capacitor. An auxiliary capacitor may be connected in parallel with each pixel.

Selection pulses $P_1$, $P_2$, $P_3$, ... as shown in FIG. 13 are respectively supplied to the scanning lines $X_1$, $X_2$, $X_3$, .... In FIG. 13, T and M respectively represent a frame period and the number of scanning lines. When a scanning line $X_1$ is selected by a selection pulse $P_1$, the TFTs $T_{11}$, $T_{12}$, ... connected to the scanning line $X_1$ become conductive between the respective sources and drains, (or turn on), so that signal voltages on the signal lines $Y_1$, $Y_2$, ... are respectively supplied to the pixels $C_{11}$, $C_{12}$, ... which are respectively connected to the TFTs $T_{11}$, $T_{12}$, .... When the selection pulse $P_1$ disappears, the TFTs $T_{11}$, $T_{12}$, ... connected to the scanning line $X_1$ become non-conductive (or turn off) and the signal voltages supplied to the pixels $C_{11}$, $C_{12}$, ... are held until the scanning line $X_1$ is again selected. In this way, the signal voltages on the signal lines can be accurately transferred to the pixels via the respective TFT switching elements, so that a high contrast display can be realized.

However, in the above described configuration, when the number of scanning and signal lines are increased it would be very difficult to produce all of the TFTs without a defect. As shown in FIG. 14 which shows a sectional view of a TFT, the source 2 and drain 3 of the TFT are isolated from the gate 1 via an insulating layer 8 and a semiconductor film 9. In such a structure, the gate and the drain or the gate and the source would be short-circuited due to a pin hole or other defects caused during manufacturing process of the TFT array. Particularly, if the gate and the source are short-circuited, all of the TFTs which are connected to the scanning and signal lines connected with the defective TFT will not properly operate. This is a serious defect called a "line defect". Furthermore, the source and the drain would also be short-circuted due to a failure of photo-lithography. In this case, the liquid crystal cell connected to the defective TFT will operate abnormally, which is called a "point defect".

A conventional LCD panel using non-linear switching elements is disclosed, for example, in "Varistor-Controlled Liquid Crystal Displays" by D. E. Castleberry, IEEE Transactions on Electron Devices, Vol. ED-26, No. 8, pp. 1123-1128 (August 1979). This LCD pannel comprises a first substrate mounting thereon a plurality of row electrodes (scanning lines), a plurality of first pixel electrodes and a plurality of non-linear switching elements (varistors in this case), and a second substrate mounting thereon a plurality of column electrodes (signal lines) and a plurality of second pixel electrodes, the first and second substrates being confronted with each other so that a plurality of liquid crystal cells are respectively disposed between the first and second pixel electrodes.

FIG. 17 shows an equivalent circuit of the above noted LCD panel, in which $S_{11}$, $S_{12}$, ... and $S_{21}$, $S_{22}$, ... are the non-linear switching elements, 7 is the liquid crystal cell, and 10 and 11 are respectively the first and second pixel electrodes. Each non-linear switching element has one terminal connected to a respective scanning line, and has another terminal connected to the first pixel electrode of a respective pixel. The second pixel electrode of each pixel is connected to a respective signal line. The non-linear switching element has a voltage-current characteristic as shown in FIG. 18 in which $V_b$ is a threshold voltage.

Selection pulses $P_1$, $P_2$, ... which are negative voltage pulses as shown in FIG. 19 are respectively supplied to the scanning lines $X_1$, $X_2$, .... In FIG. 19, T and M represent a frame period and the number of scanning lines, respectively. A signal voltage supplied to each of the signal lines $Y_1$, $Y_2$, ... is set to be smaller than the threshold voltage $V_b$ of the non-linear switching element so that the signal voltage is not supplied to non-selected pixels. When a selection pulse $P_1$ is supplied to the scanning line $X_1$, i.e., the pixels $C_{11}$, $C_{12}$, ... connected to the scanning line $X_1$ through the respective non-linear switching elements $S_{11}$, $S_{12}$, ... are selected, the voltage difference between the signal line $X_1$ and each signal line to which a signal voltage is supplied becomes the sum of the peak voltage of the selection pulse $P_1$ and the signal voltage, so that a voltage which is the difference voltage between the sum voltage and the threshold voltage is supplied to the respective pixel. After the selection pulse $P_1$ disappears, the voltage across each of the pixels $C_{11}$, $C_{12}$, ... is held until the scanning line $X_1$ is again selected (in the next frame).

As described above, in the LCD pannel using non-linear switching elements, each signal voltage is accurately and independently transferred to a pixel, so that a high contrast display without crosstalk can be realized. The other devices usable as the non-linear switching element are a diode ring, a back-to-back diode, a diode-connected MOS transistor, which are respectively shown in FIGS. 16(a), (b) and (c), and a MIM.

However, in the above described configuration of the LCD panel, if the number of scanning lines (i.e. the number of pixels) is increased, it would be very difficult to produce all of the non-linear switching elements without defects. Some non-linear switching elements would be short-circuited or open-circuited. If one of the non-linear switching elements is defective the pixel connected to the defective switching element is not supplied with a normal signal voltage so as to cause the so-called "pixel defect".

SUMMARY OF THE INVENTION

An object of the present invention is to provide an active matrix circuit for LCDs which will rarely cause a pixel defect (a line defect or a point defect) if there exists some defective switching elements in the circuit.

In order to achieve this object, each liquid crystal pixel is controlled by at least two switching elements which are respectively controlled by successive selection pulses supplied to two adjacent scanning lines. If the switching elements are transistor switching elements, the transistor switching elements have their control terminal respectively connected to two adjacent scanning lines. The transistor switching elements may have their first main terminals respectively connected in common to the pixel to be controlled, and have their second main terminals connected in common to one signal line or connected separately to two adjacent signal lines. Or, one of the two transistor switching elements may have its first main terminal connected the second main terminal of the other of the two transistor switching elements, and to the pixel to be controlled, and further connected to one signal line through another transistor switching element which has its control terminal connected to one of the two adjacent scanning lines. If the two switching elements are non-linear switching elements, the non-linear switching elements have their one terminals respectively connected in common to the pixel to be controlled, and their other terminals connected separately to two adjacent scanning lines.

With the above arrangement of the switching elements, if one of the two switching elements is defective, the defective switching element can be easily identified and the electrical connection thereto can be cut so that the element is electrically isolated from the circuit. The pixel to be controlled can be controlled by the other of the two switching elements to operate normally. Accordingly, the probability of having a pixel defect can be significantly reduced.

The conventional arrangement may be improved by two other methods - one is to add a TFT switching elements in parallel with each TFT switching element; and the other is to add a TFT switching element in parallel with each TFT switching element and further add a scanning line in parallel with each scanning line, the two parallel scanning lines being supplied with the same selection pulse and respectively connected to the gates of the two TFT switching elements. However, these methods are disadvantageous in that if one of the two TFT switching elements is defective, the defective element is difficult to identify. Furthermore, the latter method is particularly disadvantageous in that the effective display area of the LCD panel is greatly reduced.

The above and other objects, features and advantages of the invention will be apparent from the following description taken in connection with the accompanying drawings in which:

BRIEF DESCRIPTION OF THE DRAWINGS

FIG. 6 is a diagram showing an arrangement of color pixels, scanning lines and signal lines, which is applicable to the FIG. 5 circuit;

FIGS. 7(a) and (b) are arrangement diagrams of color pixels for a LCD having the FIG. 5 circuit;

DESCRIPTION OF THE PREFERRED EMBODIMENTS

In the following description and the accompanying drawings, the following reference symbols will be used:

$X_m$: scanning line (m=1, 2, 3, ... representing a row number)

$Y_n$: signal line (n=1, 2, 3, ... representing a column number)

$C_{mn}$: liquid crystal pixel $T_{mn}$, $T_{mna}$, $T_{mnb}$, $T_{mnc}$: TFT switching element $S_{mn}$, $S_{mna}$, $S_{mnb}$: non-linear switching element Embodiment 1

Figure 1:
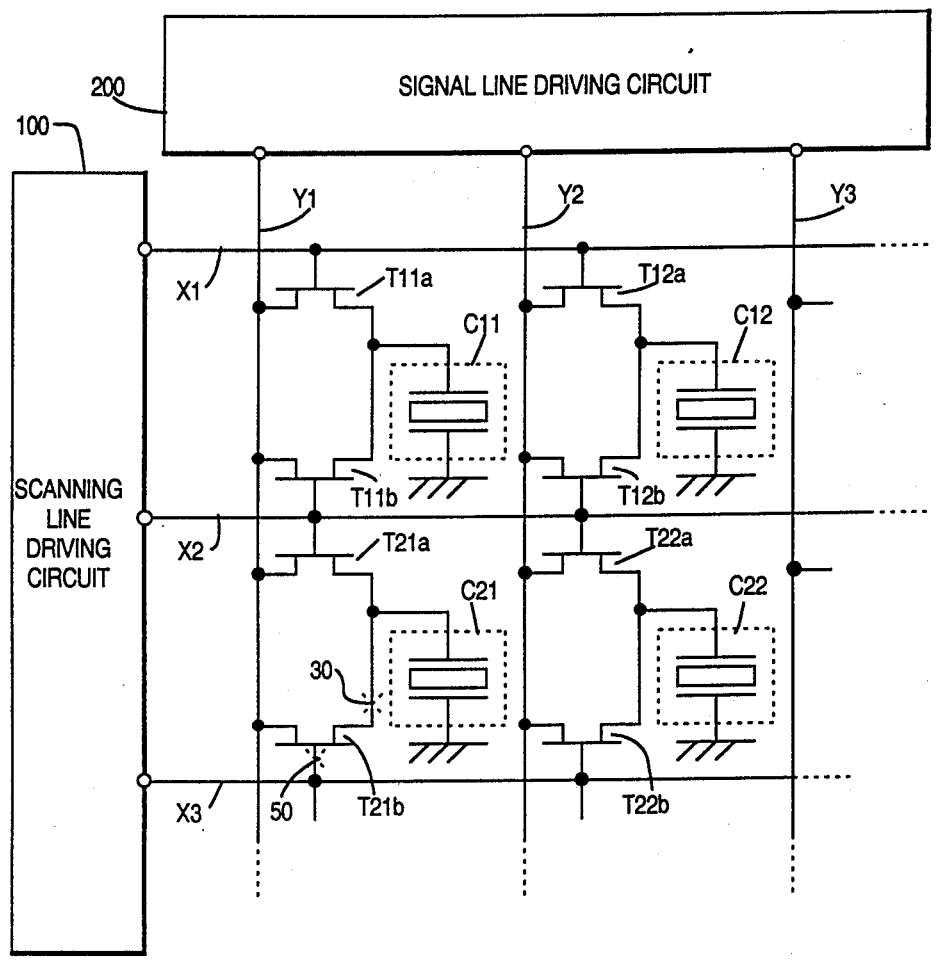
FIG. 1 is a partial circuit diagram of an embodiment of an active matrix circuit using TFT switching elements according to the present invention.

FIG. 1 shows an embodiment of an active matrix circuit using TFT switching elements. Referring to FIG. 1, two TFT switching elements ($T_{21a}$ and $T_{21b}$, for example) are provided to control each pixel ($C_{21}$, for example). TFT switching elements $T_{21a}$ and $T_{21b}$ have their gates respectively connected to two adjacent scanning lines $X_2$ and $X_3$, and have their sources connected in common to a signal line $Y_1$, and have their drains connected in common to one terminal of a pixel $C_{21}$.

The other terminal of the pixel $C_{21}$ is connected to ground. If the number of rows of the pixel matrix is M, the number of scanning lines is M+1. Selection pulses $P_1, P_2, P_3, \ldots, P_M$ produced by a well-known scanning line driving circuit 100 are supplied to the scanning lines $X_1, X_2, X_3, \ldots, X_{M+1}$ in such an order that $P_1$ is supplied to $X_1$ and $X_2$, $P_2$ to $X_3$, $P_3$ to $X_4$, ..., and $P_M$ to $X_{M+1}$ in a frame period T. Accordingly, the pulse width of each selection pulse is T/M, that is, each pixel is selected for a period T/M once in the frame period T.

Referring again to the pixel $C_{21}$, when the selection pulse $P_1$ is supplied to the scanning line $X_2$ the, TFT switching element $T_{21a}$ turns on, so that a signal voltage $V_{11}$ (for pixel $C_{11}$) on the signal line $Y_1$ produced by a well-known signal line driving circuit 200 is supplied to the pixel $C_{21}$. When the next selection pulse $P_2$ is supplied to the scanning line $X_3$, the TFT switching element $T_{21b}$ turns on, so that a signal voltage $V_{21}$ (for pixel $C_{21}$) on the signal line $Y_1$ produced by the driving circuit 200 is supplied to the pixel $C_{21}$. The pixel $C_{21}$ holds the voltage $V_{21}$ until the scanning line $X_1$ is selected in the next frame. Since the number of scanning lines is large, the effect of the voltage $V_{11}$ temporarily held by the pixel $C_{21}$ can be ignored.

Figure 2:
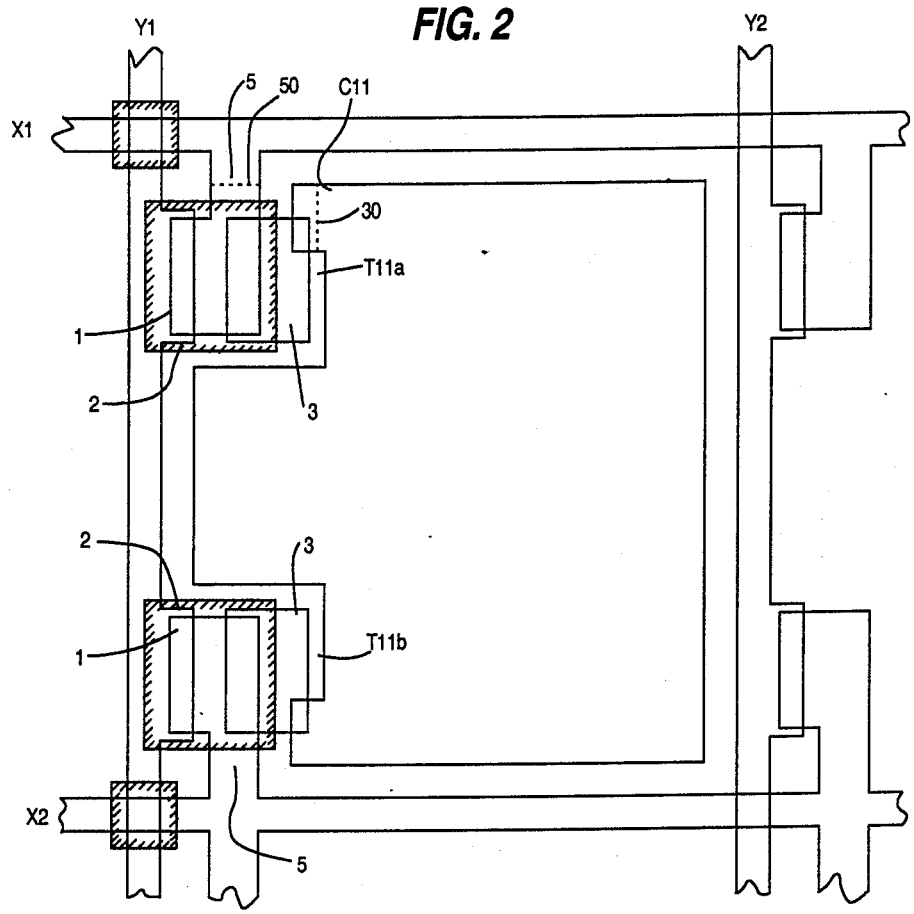
FIG. 2 is a partial mask lay-out pattern diagram of the circuit in FIG. 1.
Figure 12:
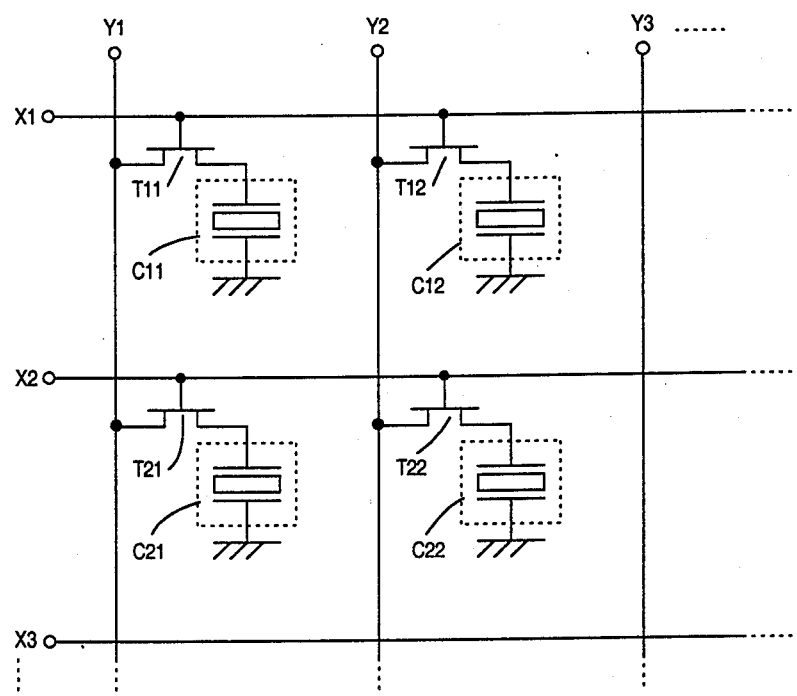
FIG. 12 is a partial circuit diagram of a typical conventional active matrix circuit using TFT switching elements.

If the TFT switching element $T_{21b}$ is short-circuited between the gate and source due to a failure in the manufacturing process, the electrical connection between the gate of the TFT switching element $T_{21b}$ and the scanning line $X_3$ is cut off as shown by a broken line symbol X 50 by means, for example, of evaporation by a laser beam, mechanical cutting or chemical etching. A partial mask lay-out pattern of the FIG. 1 circuit is shown in FIG. 2, in which element 1 is a gate; element 2 is a source; element 3 is a drain and element 5 is a connection between a gate and a scanning line. As seen from FIG. 2, the connection 5 is designed so as to be easily cut as shown by a broken line 50.

In the condition that the TFT switching element $T_{21b}$ is isolated from the circuit, the pixel $C_{21}$ holds the signal voltage $V_{11}$ for the pixel $C_{11}$ supplied via the TFT switching element $T_{21a}$ when the scanning line $X_2$ is selected until the scanning line $X_2$ is selected in the next frame. Although the pixel $C_{21}$ holds the same voltage as that held by the adjacent pixel $C_{11}$, this abnormality is hardly sensed by human eyes because there is a close correlation between adjacent pixels. Accordingly, the pixels $C_{21}$, $C_{22}$, ... do not have a line defect and the pixel $C_{21}$ does not have a point defect.

If the TFT switching element $T_{21a}$ is defective and thus isolated from the circuit, the pixel $C_{21}$ apparently operates normally under the control of the TFT switching element $T_{21b}$ to hold the signal voltage $V_{21}$. Furthermore, connection between the drains 3 of the TFT switching elements and the pixel electrode are also designed so as to be easily cut off when a short-circuit is caused between the source and drain.

Embodiment 2

Figure 3:
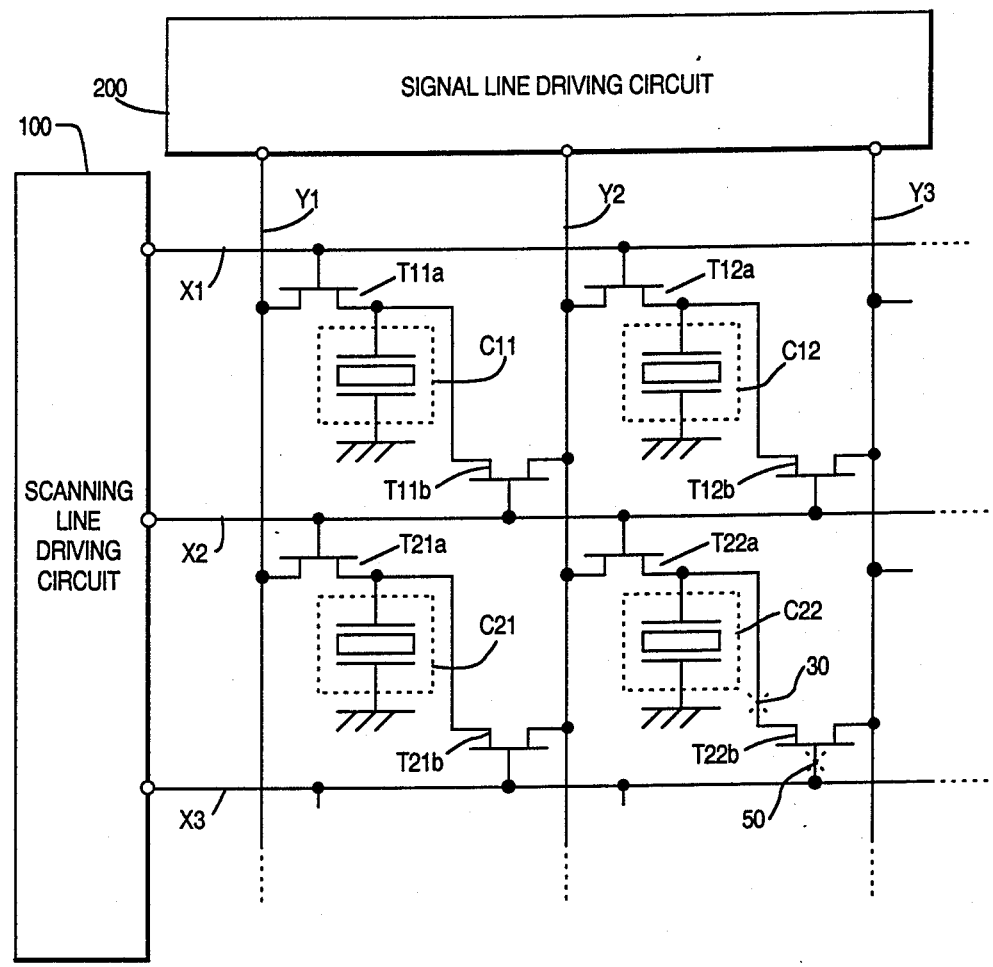
FIG. 3 is a partial circuit diagram of another embodiment of an active matrix circuit using TFT switching elements according to the present invention.

FIG. 3 shows another embodiment of an active matrix circuit using TFT switching elements. The configuration in FIG. 3 is the same as that in FIG. 1 except that the two TFT switching elements ($T_{21a}$ and $T_{21b}$, for example) for controlling each pixel ($C_{21}$) have their sources respectively connected to two adjacent signal lines ($Y_1$ and $Y_2$) disposed at both sides of the pixel ($C_{21}$). The effective signal voltage for driving the pixel $C_{21}$ is a voltage signal which exists on the signal line $Y_2$ when the scanning line $X_3$ is selected by the selection pulse $P_2$.

Figure 4:
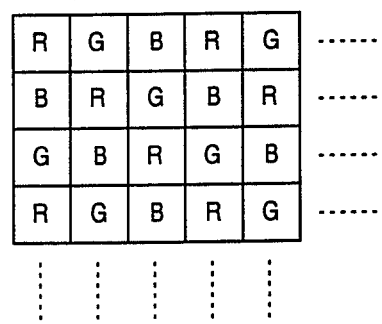
FIG. 4 is an arrangement diagram of color pixels for a LCD having the FIG. 3 circuit configuration.

This embodiment is advantageous for color display. In matrix type color displays, three primary color pixels (R, G, B) are usually arranged so that the color arrangement in each row is shifted from the color arrangement of the previous row as, for example, shown in FIG. 4. If the TFT switching element $T_{22b}$ is defective and thus isolated from the circuit, as shown by broken line symbols X 50 and 30 the signal voltage for the pixel $C_{11}$ is also supplied to the pixel $C_{22}$ via the TFT switching element $T_{22a}$. Since the colors of the pixels $C_{11}$ and $C_{22}$ are the same in the arrangement as shown in FIG. 4, the pixel $C_{22}$ holding the signal voltage for the pixel $C_{22}$ is not sensed as a point defect. If the TFT switching element $T_{22a}$ is defective and isolated from the circuit, the pixel $C_{22}$ operates normally under the control of the TFT switching element $T_{22b}$.

Embodiment 3

Figure 5:
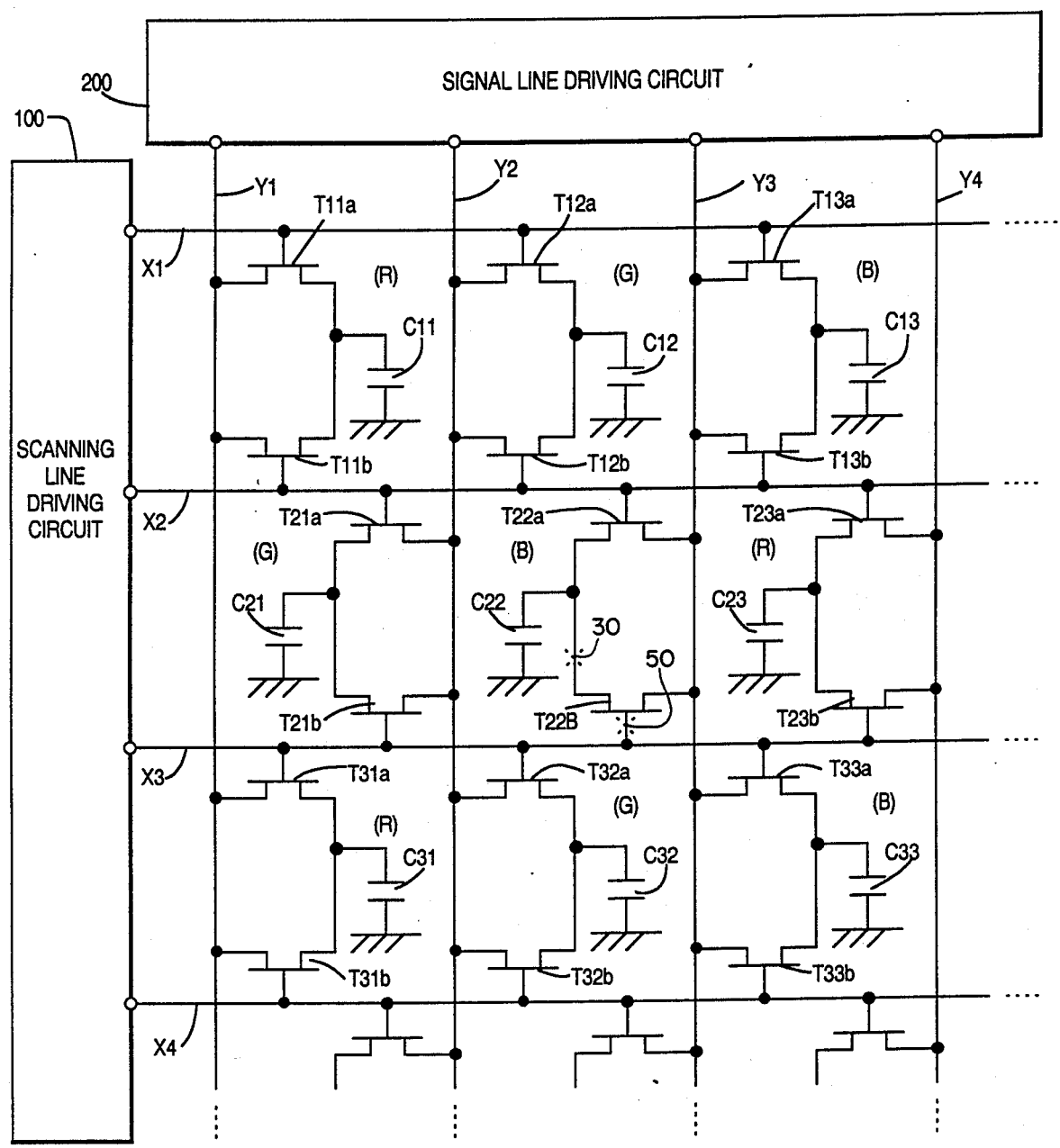
FIG. 5 is a partial circuit diagram of still another embodiment of an active matrix circuit using TFT switching elements according to the present invention.

FIG. 5 shows an embodiment of an active matrix circuit using TFT switching elements which is used for color displays having a color arrangement as shown in FIG. 7(a). Referring to FIG. 5, the two TFT switching elements for controlling each pixel disposed in each odd number row have their sources connected in common to a signal line on the left-hand side of the pixel, while the two TFT switching elements for controlling each pixel disposed in each even number row have their sources connected in common to a signal line on the right-hand side of the pixel. For example, the sources of the TFT switching elements $T_{12a}$ and $T_{12b}$ for controlling the pixel $C_{12}$ in the first row are connected to the signal line $Y_2$ on the left-hand side of the pixel $C_{12}$, while the sources of the TFT switching elements $T_{22a}$ and $T_{22b}$ for controlling the pixel $C_{22}$ in the second row are connected to the signal line $Y_3$ on the right-hand side of the pixel $C_{22}$. Except for the above described connection, the other configuration of this embodiment is the same as that of the FIG. 1 embodiment.

Figure 13:
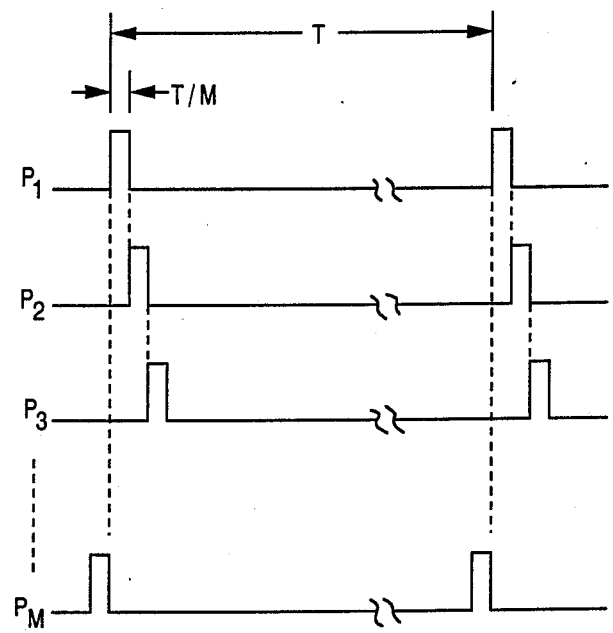
FIG. 13 is a signal timing diagram of selection pulses supplied to scanning lines of an active matrix circuit using TFT switching elements.
Figure 14:
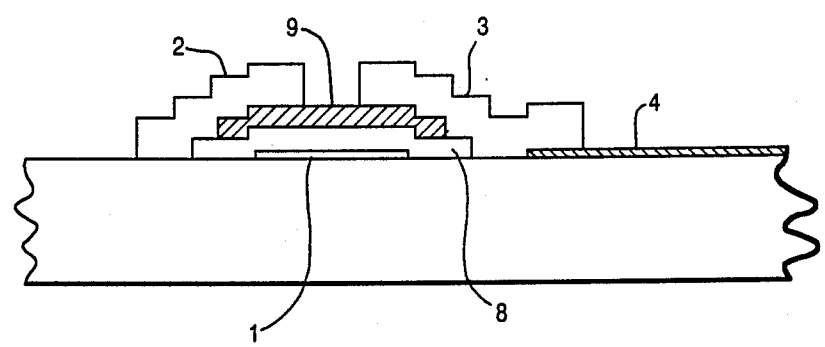
FIG. 14 is a sectional view of a typical TFT.

The selection pulses, as shown in FIG. 13, are supplied to the scanning lines in the same way as in the embodiment of FIG. 1. Each pixel is normally controlled by the lower one ($T_{mnb}$) of the two TFT switching elements connected thereto. If the TFT switching element $T_{22b}$ is defective and thus isolated from the circuit as shown by broken line symbols X 50 and 30, the pixel $C_{22}$ holds the signal voltage for the pixel $C_{13}$ which is supplied from the signal line $Y_3$ via the TFT switching element $T_{22a}$ when the selection pulse $P_1$ is supplied to the scanning line $X_2$. Since the pixels $C_{22}$ and $C_{13}$ are arranged to be the same in color as shown in FIG. 7(a), the pixel $C_{22}$ holding the same signal voltage held by the pixel $C_{13}$ is not sensed as a point defect but operates almost normally.

If the color pixels are arranged as shown in FIG. 7(b) in which pixel positions are shifted by half the width of one pixel row by row, the FIG. 5 circuit configuration may be modified as shown in FIG. 6 in which signal lines $Y_2, Y_3, Y_4, \ldots$ are bent to maintain the same positional relationship to the pixels as that of the FIG. 5 circuit.

Embodiment 4

Figure 8:
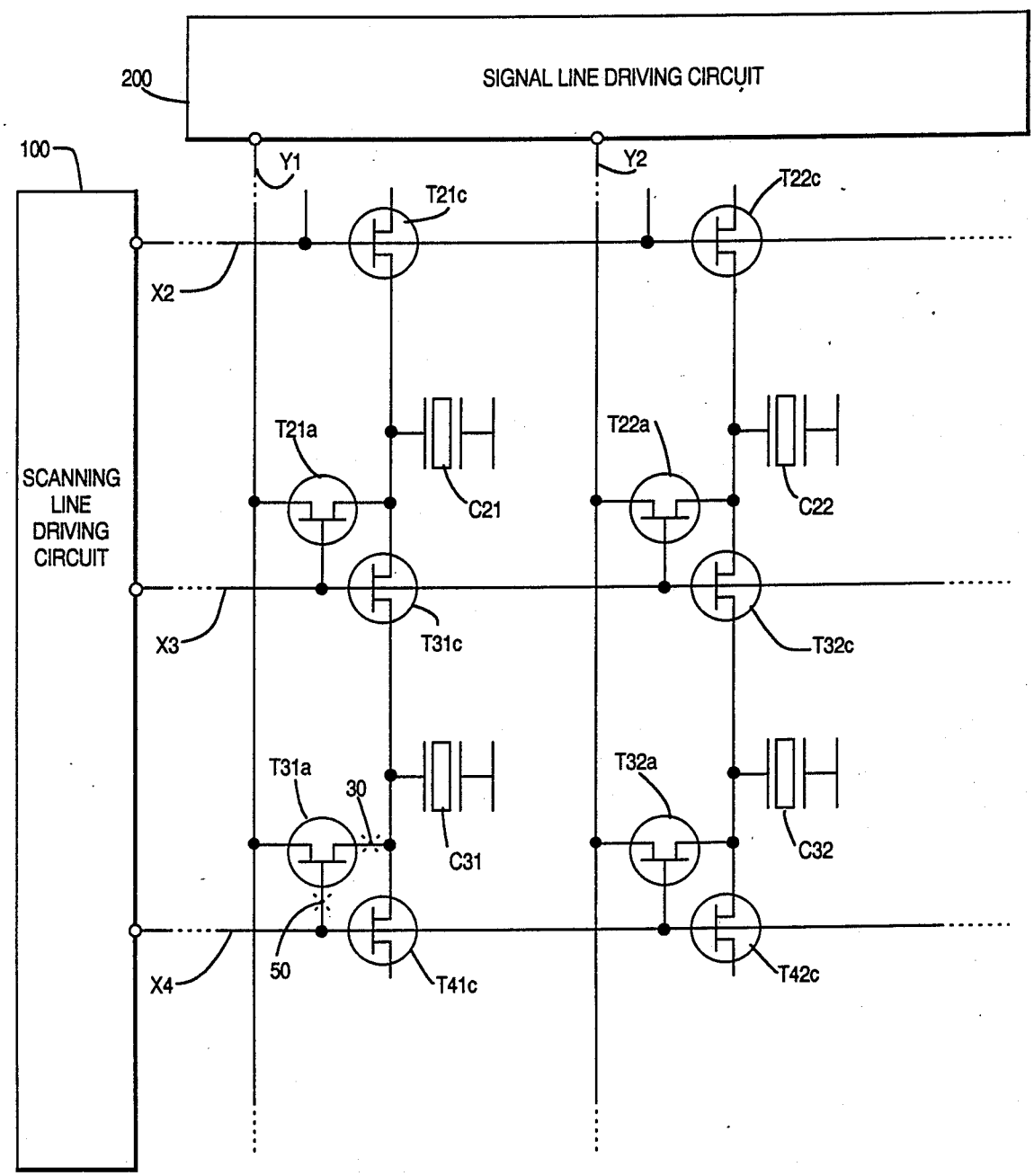
FIGS. 8, 9 and 10 are partial circuit diagrams of further embodiments of an active matrix circuit using transistor switching elements according to the present invention.

FIG. 8 shows an embodiment of an active matrix circuit using transistor switching elements. Each of the transistor switching elements may be a MOS transistor or a TFT. Referring to FIG. 8, a plurality of transistors ($T_{11c}, T_{21c}, T_{31c}, T_{41c}, \ldots$, for example) which have their gates respectively connected to the scanning lines ($X_1, X_2, X_3, X_4, \ldots$) are connected in series in each column, and each connecting point of two adjacent transistors thereof is connected to both a pixel and to a signal line via another transistor. For example, transistors $T_{21c}$, $T_{31c}$ and $T_{41c}$ which have their gates respectively connected to the scanning lines $X_2$, $X_3$ and $X_4$ are connected in series. The connecting point of the transistors $T_{21c}$ and $T_{31c}$ is connected to both the pixel $C_{21}$, and to the drain of the transistor $T_{21a}$ which has its gate connected to the scanning line $X_3$ and has its source connected to the signal line $Y_1$. The connecting point of the transistors $T_{31c}$ and $T_{41c}$ is connected to both the pixel $C_{31}$, and to the drain of the transistor $T_{31a}$ which has its gate connected to the scanning line $X_4$ and has its source connected to the signal line $Y_1$.

The selection pulses, as shown in FIG. 13 are supplied to the scanning lines in the same way as that of embodiment 1. When the scanning line $X_3$ is selected, a signal voltage $V_{21}$ for the pixel $C_{21}$ is supplied from the signal line $Y_1$ to the pixel $C_{21}$ via the transistor $T_{21a}$, and to the pixel $C_{31}$ via the transistors $T_{21a}$ and $T_{31c}$. When the next scanning line $X_4$ is selected, a signal voltage $V_{31}$ for the pixel $C_{31}$ is supplied from the signal line $Y_1$ to the pixel $C_{31}$ via the transistor $T_{31a}$, and to the pixel $C_{41}$ (not shown) via the transistors $T_{31a}$ and $T_{41c}$. The pixel $C_{31}$ thereafter holds the voltage $V_{31}$ until the scanning line $X_3$ is again selected in the next frame. Although the pixel $C_{31}$ temporarily holds the voltage $V_{21}$ for the pixel $C_{21}$ for a period T/M, it can be ignored because this period T/M is small as compared with the period T during which the pixel $C_{31}$ holds the voltage $V_{31}$ for itself. Accordingly, the normal operation of the pixel $C_{31}$ is controlled by the transistor $T_{31a}$, and the transistors $T_{21a}$ and $T_{31c}$ do not affect the normal operation of the pixel $C_{31}$.

If the transistor $T_{31a}$ is defective and electrically isolated from the circuit as shown by broken line symbols X 50 and 30, the pixel $C_{31}$ holds the voltage $V_{21}$ for the period T until the scanning line $X_3$ is again selected in the next frame. Since the pixel $C_{31}$ operates in the same way as the adjacent pixel $C_{21}$, it does not cause a pixel defect.

Embodiment 5

Figure 9:
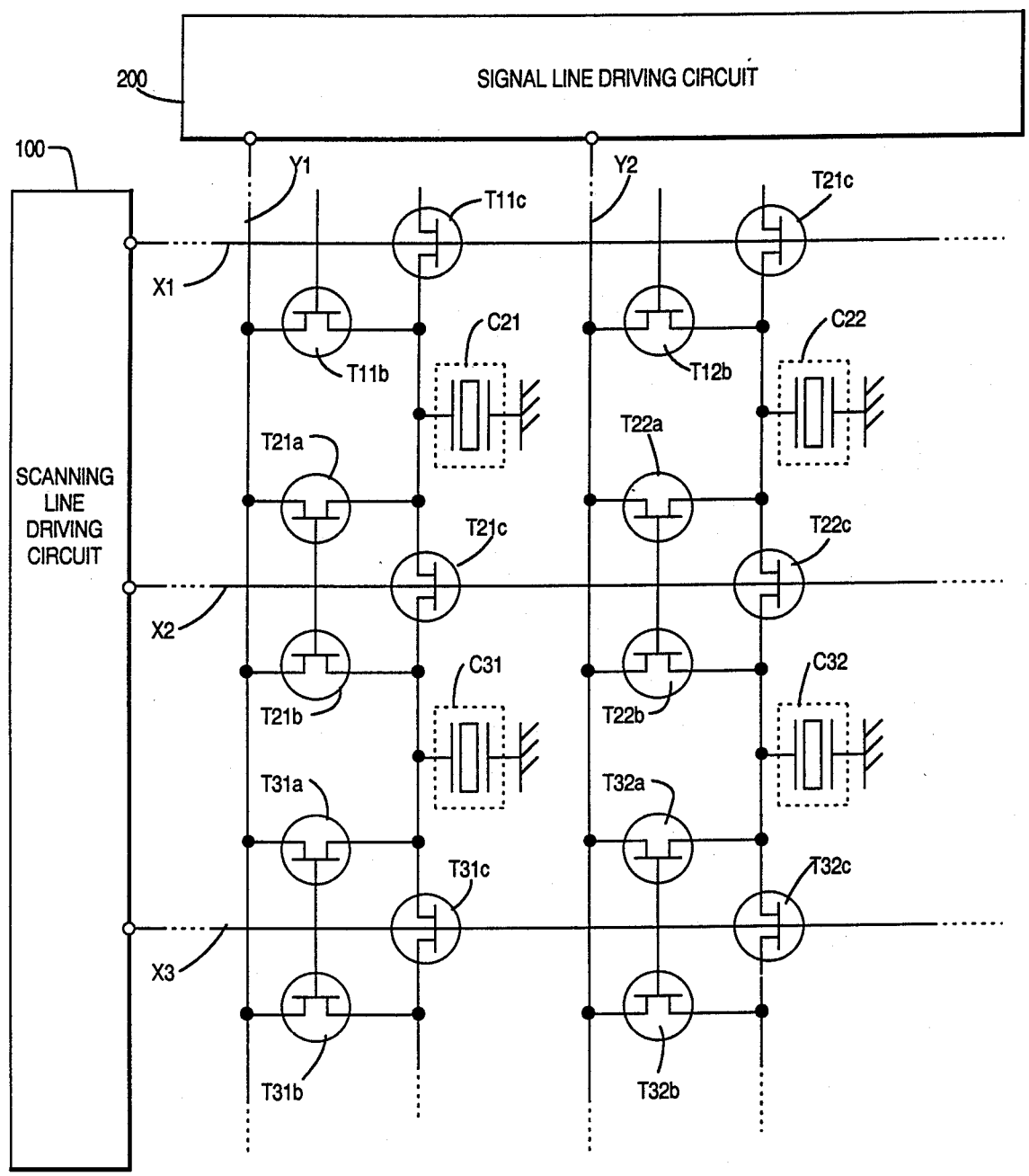

FIG. 9 shows still another embodiment of an active matrix circuit using TFT switching elements. This embodiment is a combination of the circuit shown in FIG. 1 and the circuit shown in FIG. 8. Accordingly, the operation of this embodiment may be easily understood from the foregoing description and a detailed description thereof has therefore been omitted.

Embodiment 6

Figure 10:
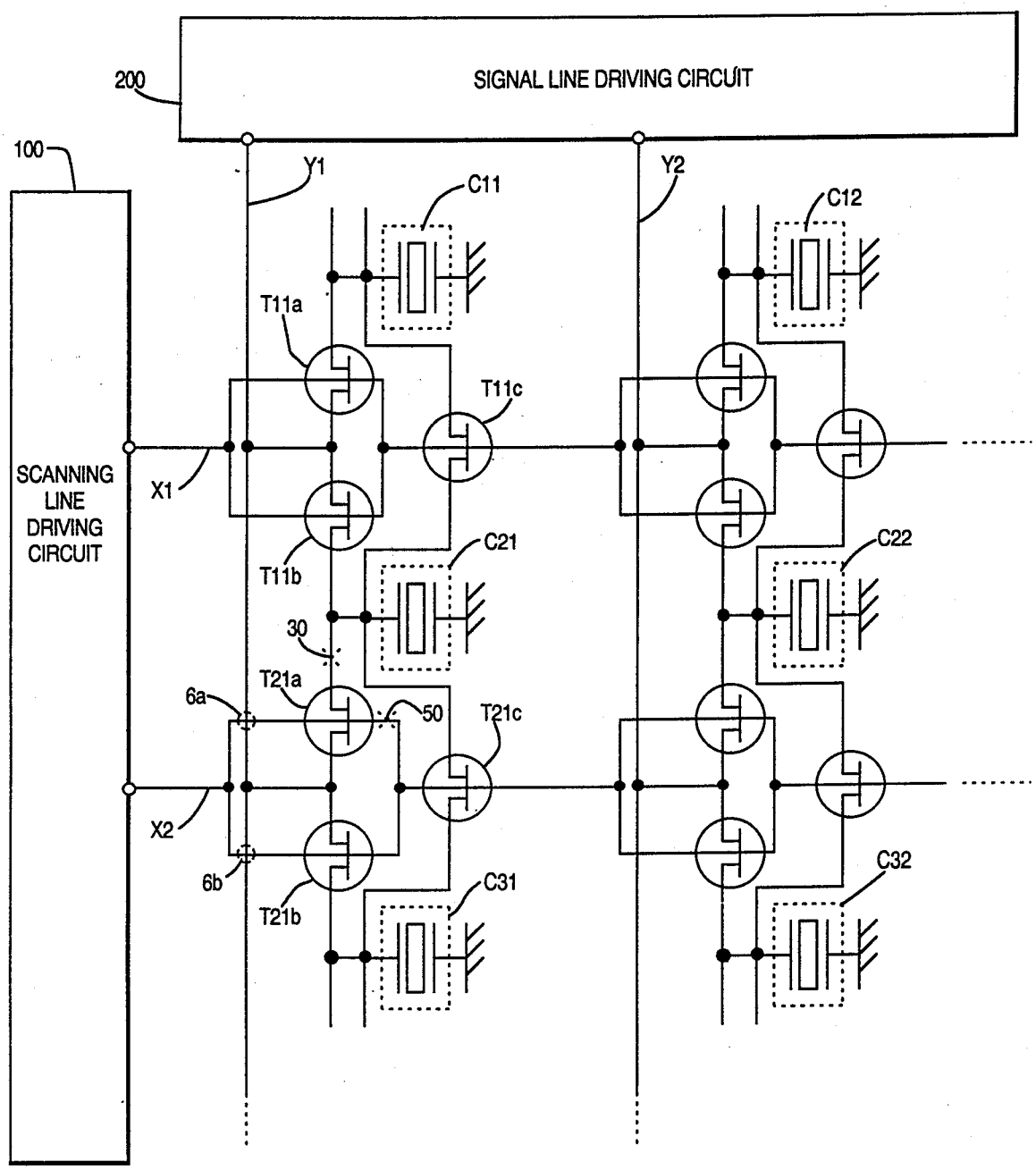
Figure 11:
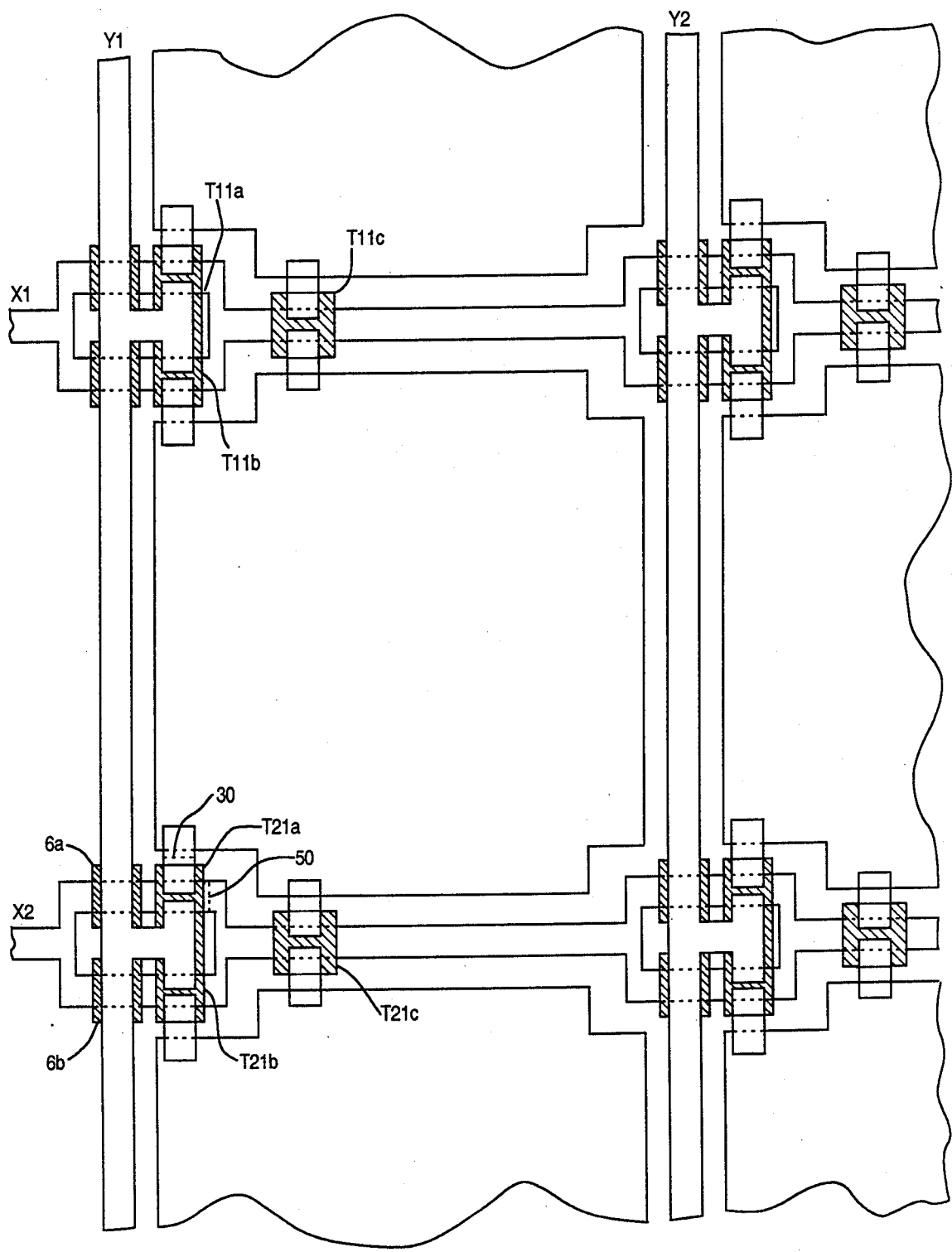
FIG. 11 is a partial mask lay-out pattern diagram of the circuit in FIG. 10.

FIG. 10 shows another embodiment of a active matrix circuit using transistor switching elements, and FIG. 11 shows a partial mask lay-out pattern of the circuit in FIG. 10. Referring to FIG. 10, each scanning line ($X_2$, for example) is divided into two branch lines (6a and 6b, for example) at each cross point of the scanning line and a signal line. Each two branch lines (6a and 6b, for example) are respectively connected to the gates of first and second transistors ($T_{21a}$ and $T_{21b}$, for example) which have their sources respectively connected have their sources in common with a signal line ($Y_1$, for example) crossing the branch lines, and at their drains separately connected to two adjacent pixels ($C_{21}$ and $C_{31}$, for example) disposed at both sides of the scanning line ($X_2$) having the branch lines (6a and 6b). Adjacent pixels ($C_{21}$ and $C_{31}$, for example) in each column are further connected to each other through a third transistor ($T_{21c}$, for example) which has its gate connected to a scanning line ($X_2$, for example) between the adjacent pixels.

First, the operation for controlling the pixel $C_{21}$ will be described in the case that the third transistor $T_{21c}$ does not exist. Selection pulses shown in FIG. 13 are supplied to the scanning lines in the same way as the previous embodiments. When the scanning line $X_1$ is selected, a signal voltage $V_{11}$ on the signal line $Y_1$ for the pixel $C_{11}$ is supplied to the pixel $C_{21}$ via the second transistor $T_{11b}$. When the scanning line $X_2$ is selected, a signal voltage $V_{21}$ on the signal line $Y_1$ for the pixel $C_{21}$ is supplied to the pixel $C_{21}$ via the first transistor $T_{21a}$. The pixel $C_{21}$ holds the voltage $V_{21}$ until the scanning line $X_1$ is again selected in the next frame. If the first transistor $T_{21a}$ is defective and thus isolated from the circuit as shown by broken line symbols X 50 and 30 in FIG. 10 and by broken lines 50 and 30 in FIG. 11, the pixel $C_{21}$ holds the voltage $V_{11}$ until the scanning line $X_1$ is selected in the next frame. Since there is again a close correlation between adjacent pixels (between $C_{21}$ and $C_{11}$ in this case), the pixel $C_{21}$ holding the same signal voltage as that held by the pixel $C_{11}$ is not recognized as a pixel defect.

Next, the operation for controlling the pixel $C_{21}$ will be described in the case that the third transistor $T_{21c}$ exists. If the first transistor $T_{21a}$ is defective and isolated from the circuit, the signal voltage $V_{21}$ is supplied to the pixel $C_{21}$ via the second and third transistors $T_{21b}$ and $T_{21c}$ when the scanning line $X_2$ is selected. Therefore, the pixel $C_{21}$ operates normally even if the first transistor $T_{21a}$ is defective. If the second transistor $T_{21b}$ is defective, it is apparent that the pixel $C_{21}$ operates normally under the control of the first and third transistors $T_{21a}$ and $T_{21c}$.

Embodiment 7

Figure 15:
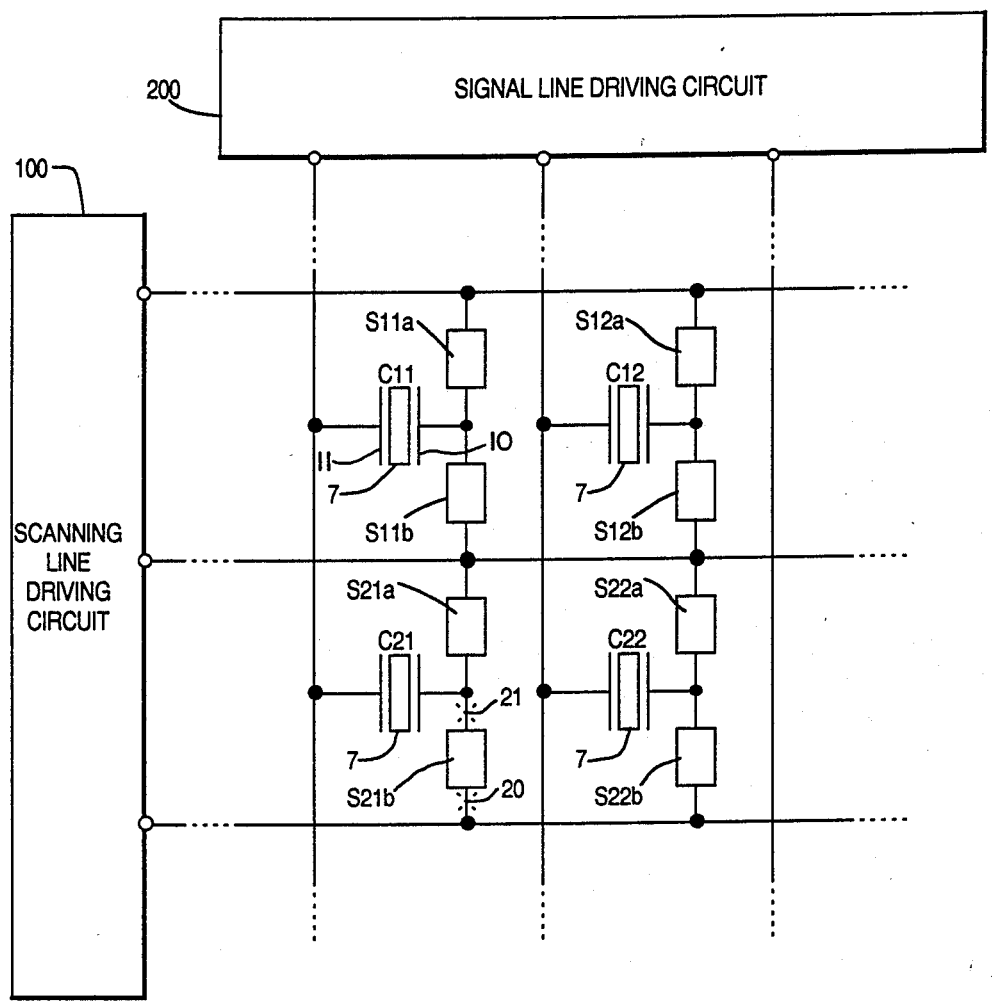
FIG. 15 is a partial circuit diagram of an embodiment of an active matrix circuit using non-linear switching elements according to the present invention.
Figure 16A:
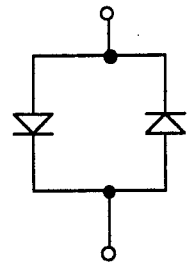
FIG. 16(a), (b) and (c) show some typical non-linear switching elements usable in the FIG. 15 circuit.
Figure 16B:
Figure 16C:
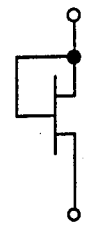
Figure 17:
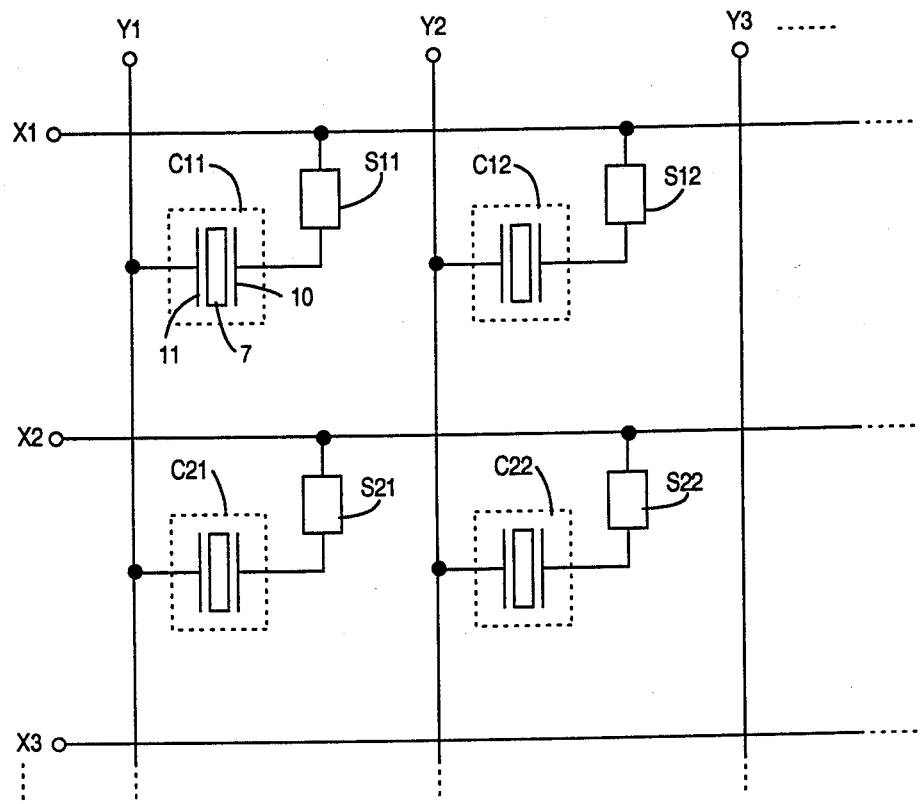
FIG. 17 is a partial circuit diagram of a typical conventional active matrix circuit using non-linear switching elements.
Figure 19:
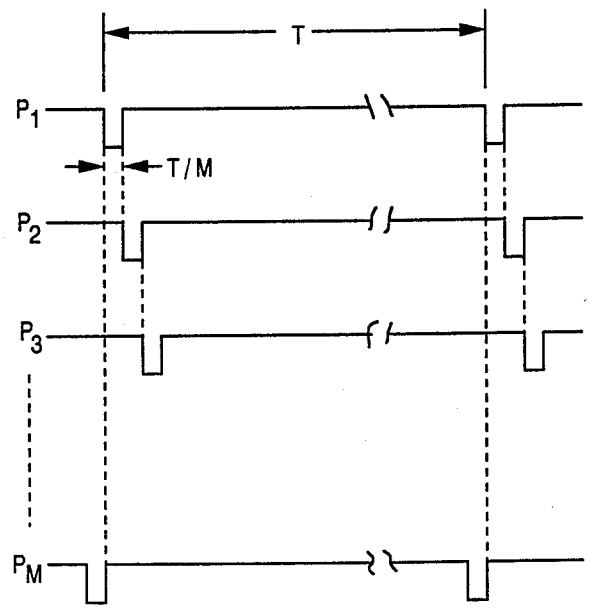
FIG. 19 is a signal timing diagram of selection pulses supplied to scanning lines of an active matrix circuit using non-linear switching elements.

FIG. 15 shows an embodiment of an active matrix circuit using two-terminal non-linear switching elements. Referring to FIG. 15, each pixel ($C_{21}$, for example) has one terminal connected to a respective signal line ($Y_1$), and has another terminal respectively connected to two adjacent scanning lines ($X_2$ and $X_3$) via two non-linear switching elements ($S_{21a}$ and $S_{21b}$). Selection pulses, as shown in FIG. 19 are supplied to the scanning lines in the same way as in the conventional circuit shown in FIG. 17. When the scanning line $X_2$ is selected, the pixel $C_{21}$ is supplied with a voltage corresponding to a signal voltage $V_{11}$ on the signal line $Y_1$ for the pixel $C_{11}$ via the switching element $S_{21a}$. When the scanning line $X_3$ is selected, the pixel $C_{21}$ is supplied with a voltage corresponding to a signal voltage $V_{21}$ on the signal line $Y_1$ for the pixel $C_{21}$ via the switching element $S_{21b}$. The pixel $C_{21}$ hold the voltage corresponding to the signal voltage $V_{21}$ until the scanning line $X_2$ is again selected in the next frame. Since the time that the pixel $C_{21}$ temporarily holds the voltage corresponding to $V_{11}$ is small relative to the time that the pixel $C_{21}$ holds the voltage corresponding to $V_{21}$, the pixel $C_{21}$ is recognized to be operating normally.

If the non-linear switching element $S_{21b}$ is defective the electrical connection between the element $S_{21b}$ and the respective scanning line $X_3$ or the respective pixel $C_{21}$ is cut off as shown by broken line symbols X 20 and 21 so that the element $S_{21b}$ is electrically isolated from the circuit. In this case, the pixel $C_{21}$ holds the voltage corresponding to the signal voltage $V_{11}$, i.e. the same voltage as that held by $C_{11}$ until the scanning line $X_2$ is selected in the next frame. Since there is usually a close correlation between signal voltages for adjacent pixels ($C_{21}$ and $C_{11}$ in this case), the pixel $C_{21}$ is not recognized as a pixel defect.

Figure 18:
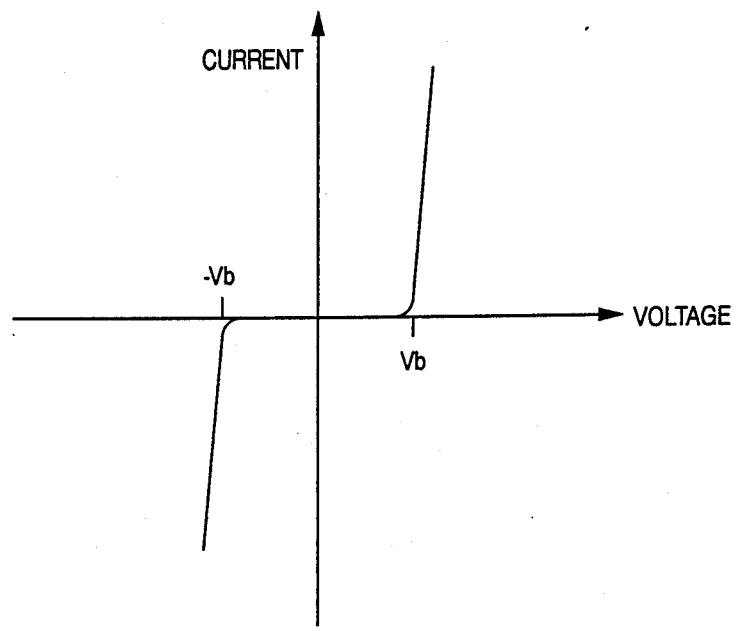
FIG. 18 is a voltage-current characteristic of a non-linear switching element.

The two-terminal non-linear switching elements may be varistors, MIMs, diode rings, back-to-back diodes, diode-connected MOS transistors, or any other devices having the characteristic shown in FIG. 18.

Defective elements can be identified by supplying proper test signals to the scanning and signal lines to display a test pattern. The thus identified defective elements are then electrically isolated by means such as laser trimming.

In the embodiments described above, supposing that probability of an element defect is $10^{-4}$, the probability that two switching elements connected to one pixel are both defective at the same time becomes $2 \times 10^{-4} \times 10^{-4} = 2 \times 10^{-8}$. Therefore, if the number of pixels is 250,000, the case that two switching elements connected to one pixel are both defective would rarely occur.

Although some preferred embodiments are described, they are only for explaining the invention but not for limiting the scope of the invention. It should be understood that other various changes and modifications may be made within the scope of the invention which is defined in the appended claims.

What is claimed is:

1. An active matrix circuit for liquid crystal displays comprising:
   a plurality of liquid crystal pixels arranged in a matrix;
   a scanning line driving circuit for producing successive selection pulses which select said pixels in turn row by row;
   a plurality of scanning lines arranged in rows and respectively supplied with said successive selection pulses;
   a signal line driving circuit for producing signal voltages which are supplied to said pixels to be selected;
   a plurality of signal lines arranged in columns and supplied with said signal voltages; and
   a plurality of switching elements responsive to said selection pulses on said scanning lines for supplying said signal voltages on said signal lines to said pixels,
   wherein each pixel of said plurality of pixels is connected to at least two switching elements of said plurality of switching elements, said two switching elements being respectively connected to two adjacent scanning lines of said plurality of scanning lines to be respectively responsive to two of said successive selection pulses supplied to said two adjacent scanning lines to select said each pixel, and
   wherein said plurality of switching elements includes at least one defective switching element which has at least a first terminal connected to a corresponding one of said plurality of scanning lines and a second terminal connected to a corresponding one of said plurality of signal lines, and wherein one of said first and second terminals of said at least one defective switching element is cut so as to be electrically isolated from the circuit.

2. An active matrix circuit for liquid crystal displays comprising:
   a plurality of liquid crystal pixels arranged in a matrix;
   a scanning line driving circuit for producing successive selection pulses which select said pixels in turn row by row;
   a plurality of scanning lines arranged in rows and respectively supplied with said successive selection pulses;
   a signal line driving circuit for producing signal voltages which are supplied to said pixels to be selected;
   a plurality of signal lines arranged in columns and supplied with said signal voltages; and
   a plurality of transistor switching elements responsive to said selection pulses on said scanning lines for supplying said signal voltage on said signal lines to said pixels, each of said transistor switching elements having source, drain and gate terminals,
   wherein each pixel of said plurality of pixels has one terminal thereof connected to ground and has another terminal thereof connected to two transistor switching elements of said plurality of transistor switching elements which respectively have their gate terminals connected to two adjacent scanning lines of said plurality of scanning line to select said each pixel, and
   wherein said plurality of transistor switching elements includes at least one defective transistor switching element which has at least one of its source, drain and gate terminals cut so as to be electrically isolated from the circuit.

3. A circuit according to claim 2, wherein said two transistor switching elements have their source terminals connected in common to one of said plurality of signal lines and have their drain terminals connected in common to said another terminal of each pixel.

4. A circuit according to claim 3, wherein said pixels disposed in each column are connected alternately to two adjacent signal lines of said plurality of signal lines via said transistor switching elements.

5. A circuit according to claim 2, wherein said two transistor switching elements have their source terminals respectively connected to two adjacent signal lines of said plurality of signal lines and have their drain terminals connected in common to said another terminal of each pixel.

6. A circuit according to claim 2, wherein said pixels in each column are connected alternately to two adjacent signal lines of said plurality of signal lines via said transistor switching elements, and wherein said pixels in each row are arranged in a predetermined color order and the arrangement of said pixels in each row is shifted columnwise by half a width of each of said pixels from the arrangement of said pixels in an adjacent row.

7. A circuit according to claim 2, further comprising a plurality of transistor switching elements each having its gate terminal connected to one scanning line of said plurality of scanning lines and having its source and drain terminals respectively connected to two adjacent pixels of said plurality of pixels disposed at both sides of said one scanning line.

8. A circuit according to claim 2, wherein one of said two transistor switching elements has its source terminal connected to one signal line of said plurality of signal lines and has its drain terminal connected to said another terminal of each pixel, and the other of said two transistor switching elements has one of its source and drain terminals connected to said another terminal of a pixel adjacent to each pixel in a column direction and has the other of its source and drain terminals connected to said another terminal of each pixel.

9. An active matrix circuit for liquid crystal displays comprising:
- a plurality of liquid crystal pixels arranged in a matrix;
- a scanning line driving circuit for producing successive selection pulses which select said pixels in turn row by row;
- a signal line driving circuit for producing signal voltages which are supplied to said pixels to be selected;
- a plurality of signal lines arranged in columns and supplied with said signal voltages;
- a plurality of scanning lines arranged in rows and respectively supplied with said successive selection pulses, each scanning line of said scanning lines being divided into two branch lines at each crosspoint of each scanning line and each of said signal lines;
- a plurality of pairs of first and second transistor switching elements responsive to said selection pulses for selecting said pixels, each pair of first and second transistor switching elements having their gate terminals respectively connected to said two branch lines, and having their source terminals connected in common to one of said plurality of signal lines, and having their drain terminals respectively connected to two adjacent pixels disposed in a column direction, said plurality of pairs of first and second transistor switching elements include at least one defective transistor switching element which has at least one of its source, drain and gate terminals cut so as to be electrically isolated from the circuit; and
- a plurality of third transistor switching elements each having its gate terminal connected to one scanning line of said plurality of scanning lines and having its source and drain terminals respectively connected to said two adjacent pixels disposed at both sides of said one scanning line.

10. An active matrix circuit for liquid crystal displays comprising:
- a plurality of liquid crystal pixels arranged in a matrix;
- a scanning line driving circuit for producing successive selection pulses which select said pixels in turn row by row;
- a plurality of scanning lines arranged in rows and respectively supplied with said successive selection pulses;
- a signal line driving circuit for producing signal voltages which are supplied to said pixels to be selected;
- a plurality of signal lines arranged in columns and supplied with said signal voltages; and
- a plurality of two-terminal non-linear switching elements responsive to said selection pulses on said scanning lines for supplying said signal voltages on said signal lines to said pixels,
- wherein each pixel of said plurality of pixels has one terminal connected to one of said plurality of signal lines and has another terminal connected in common to one terminal of two-terminal non-linear switching elements of said plurality of two-terminal non-linear switching elements, the other terminals of said two two-terminal non-linear switching elements being respectively connected to two adjacent scanning lines of said plurality of scanning lines at both sides of each pixel, and
- wherein said plurality of two-terminal non-linear switching elements include at least one defective two-terminal non-linear switching element which has at least one of its two terminals cut so as to be electrically isolated from the circuit.

* * * * *